Patented Sept. 17, 1929

1,728,206

UNITED STATES PATENT OFFICE

HEINRICH HEIMANN AND ALFONS BAYERL, OF DESSAU, GERMANY, ASSIGNORS TO I. G. FARBENINDUSTRIE AKTIENGESELLSCHAFT, OF FRANKFORT-ON-THE-MAIN, GERMANY

PROCESS OF TREATING CELLULOSE WITH LACTIC ACID AND THE PRODUCT THEREOF

No Drawing. Application filed December 11, 1926, Serial No. 154,301, and in Germany March 24, 1926.

The present invention relates to new cellulose compounds and to a process of preparing the same.

We have found that by treating cellulose with concentrated lactic acid new cellulose compounds are obtainable being valuable intermediate products in the manufacture of cellulose esters.

We prefer to subject cellulose to a treatment with a lactic acid of about 80% strength. The duration of the treatment as well as temperature employed may vary within certain limits. When working at a temperature of about 80° C., for instance, the reaction is preferably continued for about 3 hours. The excess of lactic acid is separated by centrifuging or by another suitable method and thus recovered. After having been washed and dried the cellulose is esterified in known manner. When using a lactic acid of less than 80% strength, it is sometimes desirable to omit the operation of washing the cellulose after it has been centrifuged. The effect of the preliminary treatment is no doubt a loosening of the fibres. The invention may be applied to pure cellulose, such as cotton or to any cellulose-substance free from lignin. Our new products have proved to be valuable intermediate products in the manufacture of cellulose esters. They possess a high reactivity; when subjected, for instance, to the usual acetylation process, acetylation is effected by means of a smaller quantity of acetic anhydride and in less time than was possible heretofore.

The following example illustrates the invention without limiting it the parts being by weight:

1 part of cotton is introduced, while stirring, into 20 parts of lactic acid of 80 per cent strength and stirring is continued for about 3 hours at 80° C. After pressing, the lactic acid still retained in the fibre is washed away. The dried fibre is esterified in known manner. The expressed lactic acid can be used for the treatment of another batch of material.

In applying a lower temperature in the foregoing example the cotton must be treated for a longer time to obtain the same product.

What we claim is:

1. The process which comprises treating cellulose with lactic acid of about 80% strength.

2. The process which comprises treating cellulose with lactic acid of about 80% strength at a temperature of approximately 80° C. for about three hours.

3. The process which comprises treating cellulose with lactic acid of about 80% strength at a temperature of approximately 80° C. for about three hours, pressing then the fiber, washing out the lactic acid and drying the fiber.

4. As new products, the compounds obtainable by treating cellulose with concentrated lactic acid of about 80% strength.

5. As new products, the compounds obtainable by treating cellulose with lactic acid of about 80% strength at a temperature of approximately 80° C. for about three hours.

In testimony whereof we have affixed our signatures.

HEINRICH HEIMANN.
ALFONS BAYERL.